United States Patent [19]

Koch et al.

[11] 3,987,990

[45] Oct. 26, 1976

[54] AIR CUSHION WORKPIECE CARRIER

[75] Inventors: Keith E. Koch, Tremont; Robert W. Untz, Hanna City; Donald G. Zook, Metamora, all of Ill.

[73] Assignee: Caterpillar Tractor Co., Peoria, Ill.

[22] Filed: Apr. 23, 1975

[21] Appl. No.: 570,916

[52] U.S. Cl. .......... 248/1; 269/55

[51] Int. Cl.² .......... B23D 21/14; B23D 5/34

[58] Field of Search .......... 248/23, 1; 269/55, 57, 269/58; 81/15.3

[56] References Cited

UNITED STATES PATENTS

| | | | |
|---|---|---|---|
| 2,442,499 | 6/1948 | Kraft | 81/15.2 UX |
| 2,787,175 | 4/1957 | Schurger | 269/55 UX |
| 2,956,761 | 10/1960 | Weber | 248/23 X |
| 3,108,791 | 10/1963 | Budney et al. | 269/55 X |
| 3,698,273 | 10/1972 | Richard | 269/57 |

*Primary Examiner*—J. Franklin Foss

*Attorney, Agent, or Firm*—John W. Grant

[57] ABSTRACT

A workpiece support structure has a lower planar surface disposed above and parallel to an upper planar surface of a base assembly which is adapted to be supported on the forks of a fork lift truck for transporting the carrier and the workpiece. A plurality of air pockets are formed in one of the planar surfaces for receiving pressurized air from a suitable source so that the support structure floats on a cushion of air between the planar surfaces permitting substantially frictionless movement of the support structure relative to the base assembly for precision positioning of the support structure and thus the workpiece relative to the base assembly.

10 Claims, 5 Drawing Figures

AIR CUSHION WORKPIECE CARRIER

BACKGROUND OF THE INVENTION

A recently developed method of making large earth-moving tires includes the sequential steps of wrapping layers of uncured rubber and wire around an annular core which remains within the tire carcass throughout the tire building process and is dissolved after the rubber is cured. The rubber and wire layers are applied in different types of work machines dependent upon the direction of the wrap. Thus, the core and the tire carcass in various stages of completion are handled several times. Once the core is made and the tire building process started, the core and tire carcass are maintained in a vertical direction. The weight of the core may exceed as much as 3,000 lbs. and the combined weight of the core and tire carcass of the larger sized tires may exceed 4,300 lbs. One of the difficulties encountered with such tire building process is the handling, transporting and precision positioning of the core, or the combined core and unfinished carcass, within the various work machines without damaging the somewhat fragile core or tire carcass before it is cured.

OBJECTS OF THE INVENTION

Accordingly, an object of this invention is to provide an improved air cushion workpiece carrier adapted for use with a fork lift truck for transporting rather large and/or heavy workpieces from one work area to another with the workpiece being roughly positioned at each work area by the fork lift truck.

Another object of this invention is to provide such an improved air cushion workpiece carrier which permits the workpiece to be precisely leveled at each work area.

Another object of this invention is to provide an improved air cushion workpiece carrier of the character described which permits the workpiece to be supported by an air cushion for limited substantially frictionless movement of the workpiece relative to the fork lift truck at each of the work areas for precise positioning of the workpiece.

Another object of this invention is to provide such an improved workpiece carrier for carrying an annular workpiece in a substantially vertical position.

Other objects and advantages of the present invention will become more readily apparent upon reference to the accompanying drawings and following description.

DESCRIPTION OF THE PREFERRED EMBODIMENT

Figure 1:
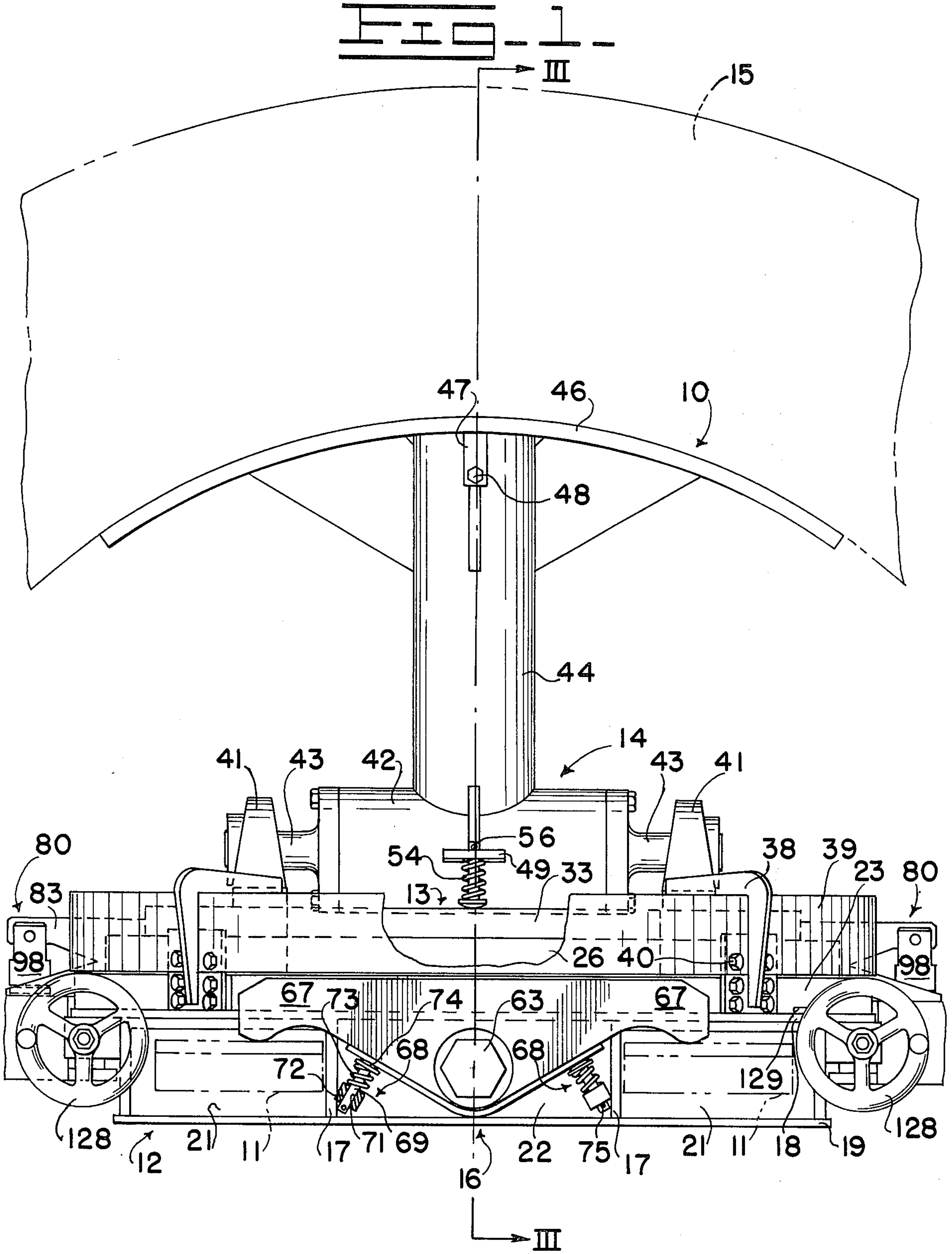
FIG. 1 is a front elevational view of the air cushion workpiece carrier embodying the principles of the present invention.

Referring more particularly to the drawings, an air cushion workpiece carrier embodying the principles of the present invention is generally indicated by the reference numeral 10 supported on a pair of forks illustrated in phantom lines at 11 of a fork lift truck, not shown. The carrier includes a lower base assembly 12, an upper saddle support structure 13 mounted on the base assembly for limited lateral movement relative thereto and a saddle assembly 14 secured to the support structure and extending upwardly therefrom for engaging and supporting an annular workpiece which is partially shown in phantom lines at 15. In one phase of its operation, as will be hereinafter described in greater detail, the saddle support structure forms an air bearing and floats on a cushion of air introduced between the saddle support structure and the base assembly.

The base assembly 12 includes a fabricated substantially rectangular base 16 having a pair of spaced parallel elongated channels 17 sandwiched between an upper base plate 18 and a lower base plate 19. The channels are disposed substantially parallel to a longitudinal axis X of the workpiece carrier and form a pair of open ended longitudinal passages 21 for receiving the forks 11 of the lift truck. A plurality of reinforcement spacer plates 22 are disposed between the channels and the upper and lower base plate. A circular plate 23 is secured to the upper base plate and has a smooth upper planar surface 24 formed thereon.

Figure 2:
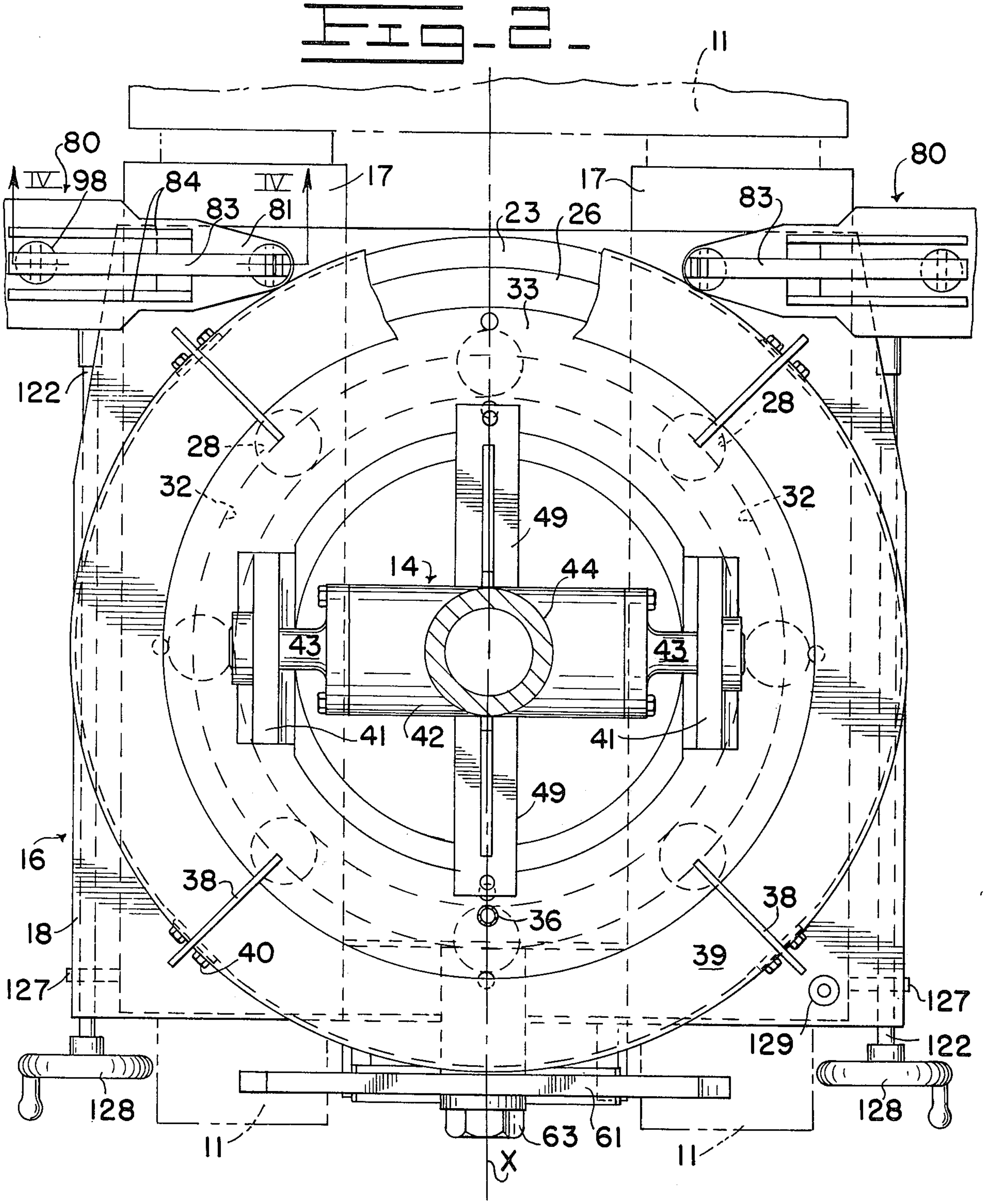
FIG. 2 is a plan view of the workpiece carrier with a portion of a saddle structure deleted for illustrative convenience.
Figure 3:
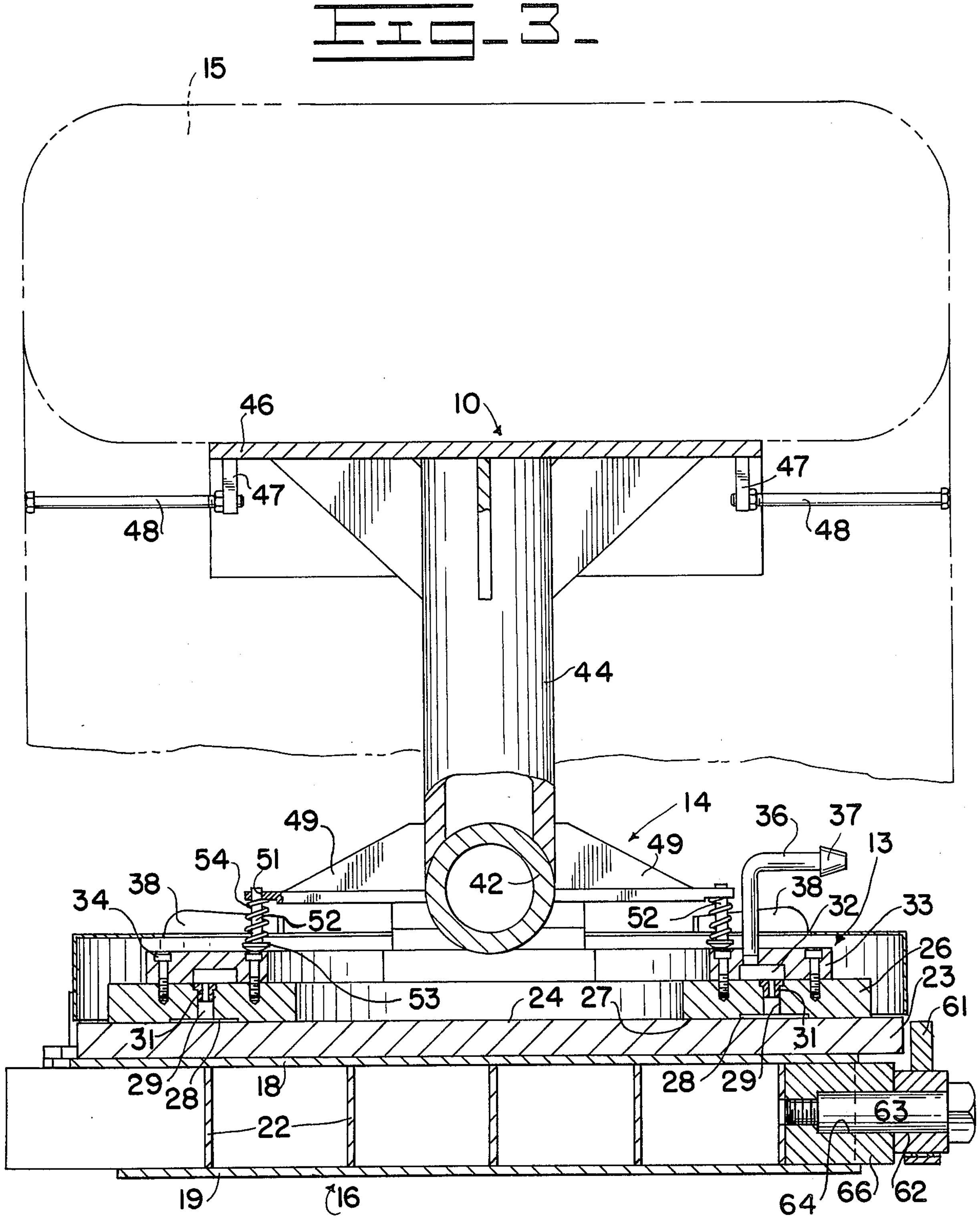
FIG. 3 is a vertical sectional view taken along line III—III of FIG. 1.

As more clearly shown in FIGS. 2 and 3, the saddle support structure 13 includes a first annular plate 26 having a lower planar surface 27 disposed adjacent to the upper planar surface 24 of the circular plate 23. A plurality of equally spaced, shallow cylindrical pockets 28 are formed in the planar surface of the first annular plate. A plurality of passages 29 are formed in the annular plate with each passage having an orifice 31 disposed therein to communicate each of the pockets with an annular manifold 32 formed in a second annular plate 33 secured to the upper surface of the first annular plate by a plurality of bolts 34. An inlet tube 36 communicates with the manifold and has a quick disconnect coupling member 37 secured to its distal end. A plurality of L-shaped retaining brackets 38 are secured to the periphery of the circular plate and extend inwardly above the second annular plate to permit limited movement of the saddle support structure relative to the base. An annular shield 39 having an L-shaped cross section is secured to the brackets by a plurality of bolts 40 to prevent dust and debris from settling on the upper planar surface 24 when the workpiece carrier is not in use.

As more clearly shown in FIGS. 1 and 2, a pair of diametrically opposed bearing blocks 41 are secured to and extend upwardly from the second annular plate 33. An elongated member 42 of the saddle assembly 14 extends between the bearing blocks and has its end 43 pivotally supported by the bearings, not shown, disposed within the bearing blocks. A pedestal 44 is secured to the mid portion of the elongated member and has an arcuate plate 46 rigidly secured to its upper end. The curvature of the arcuate plate is generated from a centerline disposed normal to the elongated member. A pair of lugs 47 are individually secured to the lower side of the arcuate plate at opposite ends thereof, FIG. 3, with each lug having an alignment bolt 48 secured thereto and extending fore and aft therefrom. A pair of stabilizer arms 49 extend longitudinally from the lower end of the pedestal. A vertically oriented bore 51 is formed in the distal end of each arm and slidably receives a pin 52 which has a spherical head 53 provided thereon for engagement with the second annular plate 33. A spring 54 circumscribes the pin and is disposed between the stabilizer arm and the spherical head for normally resiliently retaining the pedestal in a vertical position. The pin is retained in the bore by a lock pin 56 as more clearly shown in FIG. 1. Although limited relative rotation is permitted between the saddle support structure and the base 16, the saddle support structure is normally positioned so that the elongated member is disposed transversely to the longitudinal axis.

The base assembly 12 also has a three-point leveling arrangement which includes a horizontally disposed equalizer bar 61 pivotally mounted at its mid point on a pilot portion 62 of a bolt 63. The pilot portion extends into a bore 64 of a support block 66 provided as an integral part of the base 16 at the forward end of the workpiece carrier 10. The ends 67 of the equalizer bar are adapted to rest on the forward ends of fork 11, as more clearly shown in FIG. 1. The equalizer bar is normally resiliently biased to the horizontal position by a pair of biasing devices 68 disposed on opposite sides of the bolt 63. Each biasing device includes a pin 69 slidably disposed within a bore 71 formed in a lug 72 which is an integral part of the base. A spring 73 circumscribes the pin and is disposed between the lug and a spherical head 74 of the pin. A lock pin 75 extends through the pin 69 below the lug for retaining the pin within the bore.

Figure 4:
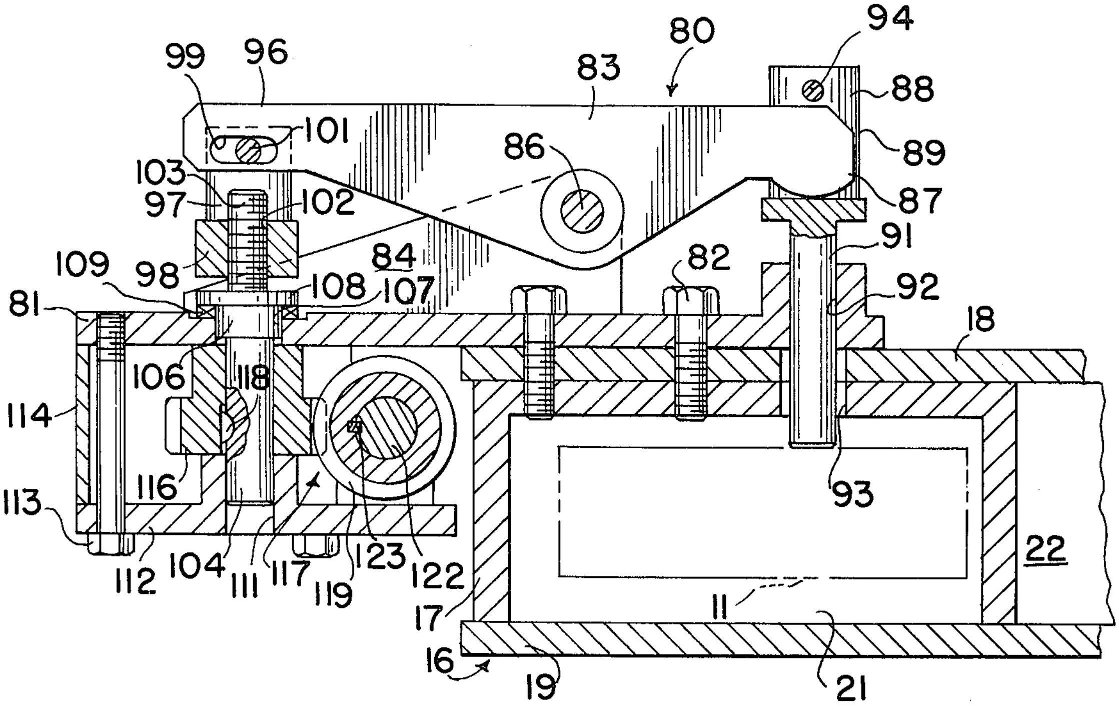
FIG. 4 is a sectional view through a leveling device taken along line IV—IV of FIG. 2.
Figure 5:
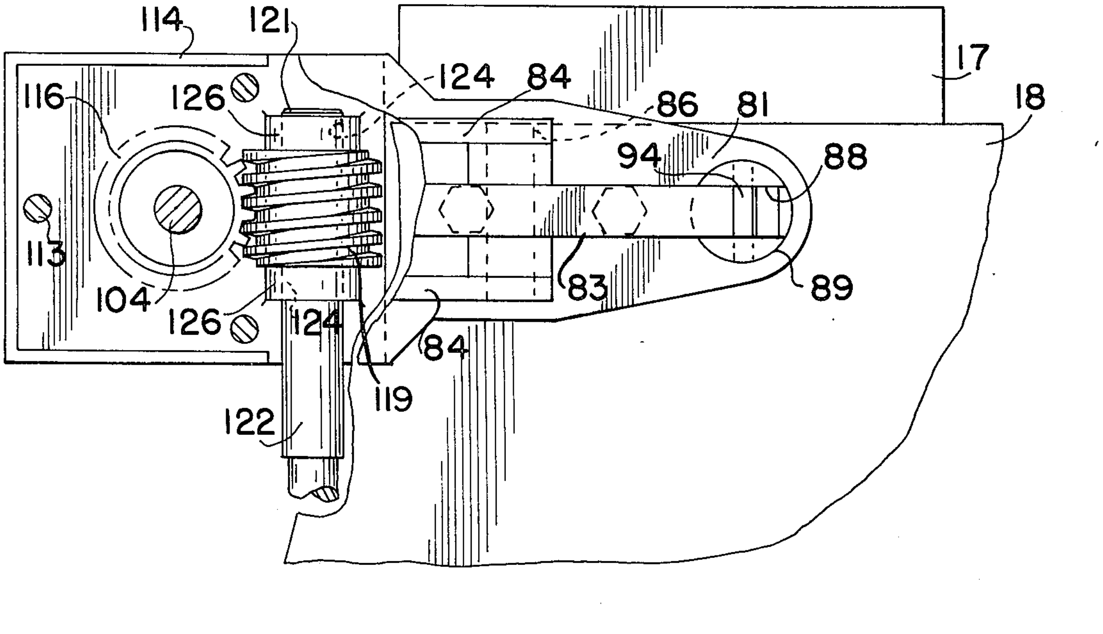
FIG. 5 is a plan view of the leveling device of FIG. 4 with portions broken away for illustrative convenience.

As more clearly shown in FIGS. 2, 4, and 5, a pair of adjustable jacks 80 are individually disposed at the rear corners of the base 16 to permit each corner to be raised or lowered independently relative to the forward end of the base. Each jack includes a mounting bracket 81 which is secured to the upper base plate 18 by a plurality of bolts 82 and extends laterally outwardly from the upper base plate. A lever 83 is disposed between a pair of plates 84 extending upwardly from the mounting bracket and is pivotally secured thereto by a pivot pin 86. An end 87 of the lever extends into a slot 88 formed in an enlarged head portion 89 of a pin 91 slidably disposed within a vertically oriented bore 92 formed in the mounting bracket in axial alignment with an aperture 93 opening into the passage 21. The end of the lever is retained in the slot by a pin 94 which extends through the enlarged head portion and spans the slot above the end of the lever. The opposite end 96 of the lever extends into a slot 97 formed in a threaded member 98 and has an elongated substantially horizontally disposed slot 99 formed therein. A pin 101 extends through the slot in the lever and has its ends secured to the bifurcated portion of the threaded member. The threaded member has a vertically disposed threaded bore 102 formed therein and which screw threadably receives a threaded portion 103 of a vertically disposed shaft 104. An enlarged portion 106 is formed on the shaft axially adjacent to the threaded portion and is journalled within a bore 107 formed in the mounting bracket. The enlarged portion has a radially outwardly extending flange 108 seated on a bearing 109 which circumscribes the enlarged portion and is supported by the mounting bracket. The lower end of the shaft is rotatably disposed within a bore 111 formed in a lower plate 112 which is secured to the mounting bracket by a plurality of bolts 113 and is spaced therefrom by a U-shaped spacer plate 114, as more clearly shown in FIG. 5.

A worm wheel 116 of a worm gear drive 117 is disposed on the shaft 104 between the mounting bracket 81 and the lower plate 112 and is keyed to the shaft with a drive key 118. A worm gear 119 of the worm gear drive meshes with the worm wheel and is keyed to an end 121 of a horizontally disposed shaft 122 with a key 123. The end of the shaft is rotatable within bores 124 formed in a pair of spaced lugs 126 secured to and extending upwardly from the lower plate, with the worm gear disposed between the lugs. The shaft is disposed substantially parallel to the channels 17, with its opposite end extending through a laterally extending lug 127 at the forward end of the base. A crank wheel 128 is secured to the distal end of the shaft for rotating the shaft. A bubble level 129 is secured to the forward corner of the upper base plate adjacent to one of the crank wheels for convenience in determining when the base is precisely leveled.

OPERATION

While the operation of the present invention is believed clearly apparent from the foregoing description, further amplification will subsequently be made in the following brief summary of such operation. In use, the air cushion workpiece carrier 10 is transported on the forks 11 of a lift truck, with the forks inserted into the passages 21 from the rearward end so that the ends 67 of the equalizer bar 61 are resting on the forward ends of the fork. In the transport condition for transporting an annular workpiece 15 from one work station to another, the lower planar surface 27 of the saddle support structure is seated on the upper planar surface 24 of the base 16. The workpiece carrier is inserted into the opening of the annular workpiece and raised by the forks so that the arcuate plate 46 engages the inner peripheral surface of the annular workpiece. The annular workpiece is centered on the saddle assembly by aligning one of the bolts 48 with the sides of the annular workpiece before the arcuate plate engages the inner peripheral surface. This places the center of gravity of the workpiece substantially in line with the axis of the pedestal 44. After the workpiece has been raised from its supporting structure, it is then transported to the next work station or storage area. A typical work station may include a work machine in which the annular workpiece is inserted and precisely positioned for a machining or processing step to be performed thereon.

Prior to inserting the annular workpiece into the work machine at that station, the jacks 80 are employed to precisely level the base 16 by manual rotation of the crank wheels 128. Rotating one of the crank wheels associated with its respective jack in a first direction causes the threaded member 98 to move upwardly, pivoting the lever 83 about its pivot 86 so that the end 87 of the lever forces the pin 91 downwardly against the fork, resulting in raising of the corner of the base relative to the fork. Rotating the crank wheel in the opposite direction results in lowering the corner of the base relative to the fork. Both crank wheels may be turned as necessary for leveling the base.

After the base 16 has been leveled and the annular workpiece roughly positioned within the work machine, a source of pressurized air is connected to the inlet tube 36 so that pressurized air is directed through the manifold 32, the orifices 31, and passages 29 into the cylindrical pockets 28. The pressurized air in the pockets causes the lower planar surface 27 to separate slightly from the upper planar surface 24 so that the saddle support structure 13 rides on a cushion of air. The pockets, being equally spaced, provide balanced lifting of the saddle support structure. The cushion of air permits substantially frictionless movement of the saddle support structure and thus the annular workpiece relative to the base so that the annular workpiece may be precisely positioned within the work machine with a minimal of force exerted against the annular workpiece. The annular workpiece may be aligned vertically by pivoting the saddle assembly within the bearing blocks 41.

In view of the foregoing, it is readily apparent that the structure of the present invention provides an improved air cushion workpiece carrier with which the workpiece can be precisely positioned within a work station. During the precision positioning, the workpiece is supported by an air cushion permitting substantially frictionless movement of the workpiece relative to the fork lift truck. The workpiece carrier also includes a three point leveling arrangement including a pair of manually adjustable jacks for precise leveling of the base assembly to compensate for uneven floors in the work area or bent or unlevel forks.

While the invention has been described and shown with particular reference to the preferred embodiment, it will be apparent that variations might be possible that would fall within the scope of the present invention, which is not intended to be limited except as defined in the following claims.

What is claimed is:

1. An air cushion workpiece carrier adapted to be transported on the forks of a lift truck and connectable to a source of pressurized air, comprising;

a base assembly supported on the forks of the lift truck and having an upper planar surface;

a workpiece support structure having a lower planar surface disposed above and parallel to said upper planar surface of the base assembly;

means forming a plurality of air pockets in one of the planar surfaces for receiving pressurized air from the source of pressurized air so that the support structure is supported by and floats on a cushion of air between the planar surfaces permitting substantially frictionless movement of the support structure relative to the base assembly for precision positioning of the workpiece relative to the base assembly; and retaining means operatively associated with the base assembly for retaining the workpiece support structure substantially above the base assembly while providing for limited unrestrained movement of the workpiece support structure in any direction.

2. The air cushion workpiece carrier of claim 1 wherein said air pockets are formed in the lower planar surface of the support structure and including a manifold for receiving the pressurized air and communicating with each of the air pockets for substantially equal distribution of air thereto.

3. The air cushion workpiece carrier of claim 2 wherein the support structure includes a first annular plate with said lower planar surface being formed thereon, and a second annular plate secured to the top of said first annular plate with said manifold being formed in said second annular plate, and including means forming a plurality of passages individually communicating the air pockets with the manifold.

4. The air cushion workpiece carrier of claim 3 including an orifice disposed in each of said passages for limiting air flow through said passage and into the air pocket.

5. The air cushion workpiece carrier of claim 1 wherein the retaining means includes a plurality of brackets secured to the base assembly and extending inwardly above the support structure.

6. The air cushion workpiece carrier of claim 1, for insertion into a central opening of an annular workpiece and engageable with an inner peripheral surface of the annular workpiece, including a saddle assembly disposed above and secured to the support structure and having an arcuate seat formed thereon for engagement with said inner peripheral surface of the annular workpiece, the arcuate seat having a curvature substantially matching the curvature of the inner peripheral surface of the annular workpiece.

7. The air cushion workpiece carrier of claim 6 wherein the saddle assembly is pivotally secured to the upper member to permit vertical alignment of the annular workpiece and includes means for limiting the pivotal movement of the saddle assembly relative to the upper member.

8. An air cushion workpiece carrier adapted to be transported on the forks of a lift truck and connectable to a source of pressurized air, comprising;

a base assembly supported on the forks of the lift truck and having an upper planar surface;

a workpiece support structure having a lower planar surface disposed above and parallel to said upper planar surface of the base assembly;

means forming a plurality of air pockets in one of the planar surfaces for receiving pressurized air from the source of pressurized air so that the support structure is supported by and floats on a cushion of air between the planar surfaces permitting substantially frictionless movement of the support structure relative to the base assembly for precision positioning of the workpiece relative to the base assembly; and means operatively associated with the base assembly for precisely leveling the base assembly, said leveling means including an equalizer bar pivotally attached to one end of the base assembly and having opposite ends adapted to engage the forks, and a pair of adjustable jacks attached to the opposite end of the base assembly and individually disposed in the corners thereof for engagement with the forks.

9. The air cushion workpiece carrier of claim 8 wherein each of said jacks includes a bracket, a lever having opposite ends and pivotally connected to the bracket intermediate said ends with one of said ends disposed for operative engagement with the respective fork, and means connected to the other of said ends for pivoting the lever about its pivot for raising and lowering the respective corner of the base assembly relative to the fork.

10. The air cushion workpiece carrier of claim 9 wherein said pivot means includes a threaded member pivotally connected to said other end of the lever and having an internal thread formed therein, a first shaft having a threaded portion screw threaded to said internal thread of the threaded member so that rotation of the first shaft causes the threaded member to pivot the lever about its pivot, a worm wheel attached to the first shaft, a worm gear in mesh with the worm wheel, a second shaft connected to the worm gear, and a crank wheel attached to the second shaft so that rotating the crank wheel causes rotation of the first shaft.

* * * * *